Dec. 23, 1930.    F. VON MADALER    1,786,274
SYNCHRONOUS MOTION PICTURE AND SOUND REPRODUCTION
Original Filed Dec. 6, 1928
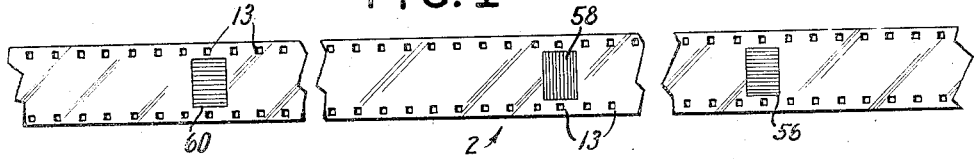
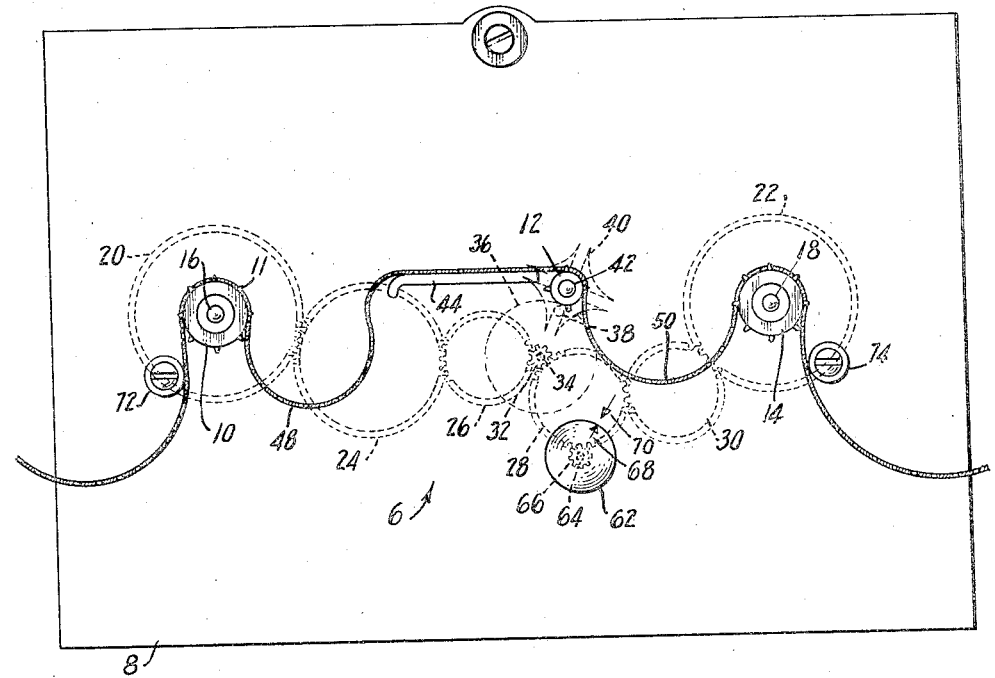
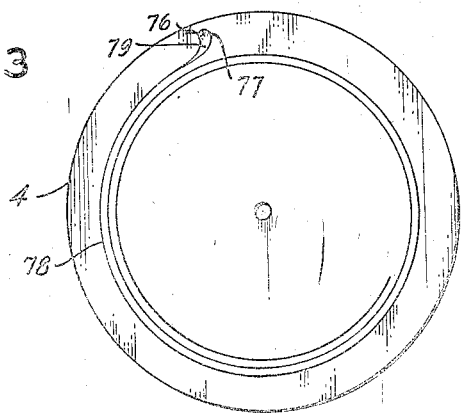
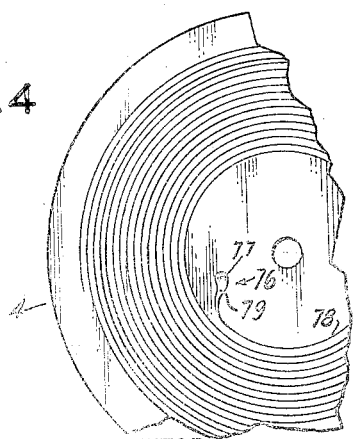
INVENTOR
Ferdinand von Madaler
BY
Van Deventer & Simmons
ATTORNEYS.

Patented Dec. 23, 1930

1,786,274

UNITED STATES PATENT OFFICE

FERDINAND von MADALER, OF HAMPTON BAYS, NEW YORK, ASSIGNOR, BY MESNE ASSIGNMENTS, TO NATIONAL VISION-TONE CORPORATION, OF NEW YORK, N. Y., A CORPORATION OF DELAWARE

SYNCHRONOUS MOTION-PICTURE AND SOUND REPRODUCTION

Application filed December 6, 1928, Serial No. 324,073. Renewed May 17, 1930.

This invention relates to synchronous motion picture projection and sound reproduction.

An object of this invention is to provide, for the operation of so-called "talking" moving picture apparatus, a novel method of synchronizing light and sound records, for the purposes of making more complete the illusion, produced by such pictures.

A further object of this invention is to provide, for use in apparatus producing so-called "talking" moving pictures, a film and sound record, so marked and designated for setting up such film and record in the apparatus for operation, that synchronous operation must necessarily result, after such initial set-up.

An additional object of this invention is to provide, in conjunction with a film and sound record of the type described, suitable mechanism in the apparatus proper, with which such film and record are to cooperate, so as to assure synchronous action.

A further object of the invention is to provide a motion picture film and a sound record, suitably marked, so that, when said film and said record are assembled with a motion picture apparatus and a sound reproducing apparatus, respectively, and the apparatus then operated synchronously, the result must necessarily be synchronous reproduction by each apparatus, so that, if the apparatus be adjacently located, the effect of "talking" moving pictures will result.

It is a further object of this invention to arrange the indicia on the film, as above described, so that, when the film is set-up with the mechanism provided for feeding it through the motion picture projector, with which it is intended it should cooperate, the film will be properly arranged with respect to said feeding means so that the danger of breaking the film from excessive tension, or of improper projection, from insufficient tension, it will be avoided.

It is a further object of this invention to provide an arrangement of the type described, of simple construction, readily assembled, which lends itself to cheapness in manufacture, and which is easy to manipulate or assemble by anyone, without the necessity of any prior knowledge, skill, or the like.

Certain features of novelty, shown and described herein, are shown, described and claimed in my copending applications, Serial Nos. 324,072 and 324,076 filed December 6, 1928, and are, therefore, not claimed herein, and this application is a continuation in part of my copending application, Serial No. 317,531, filed Nov. 6, 1928.

In addition to the objects above set forth, and exclusive of the objects of invention, necessarily included within the copending applications, above mentioned, other objects of this invention will in part be obvious and in part be hereinafter pointed out.

The invention accordingly consists in the features of construction, combinations of elements, and arrangements of parts which will be exemplified in the constructions hereinafter described, and of which the scope of application will be indicated in the following claims.

In the accompanying drawing, in which is shown one of the various possible illustrative embodiments of this invention, Fig. 1 is a plan view of a film, upon which have been placed the indicia, forming a part of an embodiment of my invention.

Fig. 2 is an elevational view of a film feeding mechanism for conjunctive use with the film shown in Fig. 1.

Fig. 3 is a plan view of a sound record, having suitable indicia for the setting of said record relative to the stylus of a reproducer, for synchronous setting with regard to the film and film feeding mechanism shown in Figs. 1 and 2.

Fig. 4 is an enlarged partial plan view of a sound record wherein the sound groove progresses from the center of the record outwardly and showing the starting indicia applied to the innermost groove.

While the invention hereinafter more particularly described is illustrated and described in especial relation to a film feeding means in which the film is fed intermittently, it is to be understood that the invention has application to an arrangement in which the film is continuously fed, wherein may be used some particular arrangement for obtaining the necessary momentary distinctness of image, so that the principle of inertia or persistency of vision will be capable of application.

In the particular embodiment of the invention shown in the drawings, there is illustrated a film 2 and a sound record 4, upon each of which has been stamped, cut, or otherwise marked, suitable indicia, hereinafter described, for the purposes hereinafter set forth, the film being arranged to cooperate with the film feeding means 6, shown in Fig. 2.

Film feeding means 6 is of the type more particularly described in my copending application, Serial No. 324,072, filed December 6, 1928, above set forth, only the features thereof necessary for the complete comprehension of the particular invention herein involved being disclosed in this application. As described in my copending application, film feeding means 6 is suitably mounted on a panel 8, and is seen to comprise a plurality of sprockets 10, 12, and 14. Sprockets 10, 12, and 14 are provided with the customary teeth 11 for engagement with the perforations 13 in the film 2. Sprockets 10 and 14 are mounted upon the exterior ends of shafts 16 and 18, which extend back through panel 8 into a gear casing (not shown) behind the panel 8, and in which is housed the gearing arrangement for operation of the sprockets 10, 12, and 14 synchronously. On the interior ends of shafts 16 and 18 are mounted gears 20 and 22, to each of which are geared suitable idler gears 24, 26, 28, 30, to form a gear train, connecting positively with the driven gear 32, which is mounted upon a shaft 34, deriving power from any desired power source, or, as is disclosed in my copending application above set forth, from an electric motor. The arrangement of gears 24, 26, 28, 30 and 32 is such that the sprockets 10 and 14 turn in the same direction, and at the same speed.

Mounted concentrically with gear 32 on shaft 34 is the plate 36. Upon plate 36 is mounted a pin 38 which, together with the particular elements mounted on plate 36 and not shown herein as not forming any part of the particular invention involved, forms one element of a Geneva movement, of which the Maltese cross 40 forms the other element. Said movement comprises means to transmit intermittent motion to the shaft 42, and thereby to the sprocket 12, which is securely mounted thereon.

While the top-most line of the surfaces of sprockets 10, 12, and 14 are substantially in the same horizontal plane, and while the sprockets are in line, substantially, it is still quite apparent, due to the intermittent motion transmitted to film 2, fed through such device, that some arrangement must be made to compensate, for such intermittent movement, between the sprockets 10 and 12, and 12 and 14. Such compensation is necessary in order that the film 2 will be properly protected against tearing, and that proper tension will be applied to the film for retaining a stiff surface at the gate 44, the film surface of which is substantially in the plane of the imaginary surface in which lie the top-most lines of the surfaces of the sprockets 10, 12, and 14. For this purpose, provision is made of suitable loops 48, 50, between the respective sprockets 10 and 12, and 12 and 14. Sufficient slack is thus allowed at each side of the intermittent motion sprocket 12, either at the beginning of operation, or at any time thereafter, for the action of the continuous motion sprockets 10 and 14 on film 2.

The measure of sufficient slack to form such loops is, of course, not a matter known to every operator of a moving picture camera, or projection apparatus, and, therefore, would not be a matter of knowledge to the amateur operator, for whom apparatus of the type disclosed herein, and in the copending applications, above denoted, is intended. Too much slack may produce unnecessary vibration of the film at the gate 44, with resultant defect in projection. Too little slack would result, of course, in excessive strain on the film 2, with possible rupture. In this construction, therefore, the film 2 is marked, at the beginning of the film strip, and at suitably spaced intervals with indicia 56, 58, and 60. Such indicia are placed to indicate the points of the film 2 which are to be brought into engagement with the sprockets 10, 12, and 14, prior to the commencement of the projection operation. By so arranging the film at the time before projection thereafter suitable slack or loops will be provided to prevent any dangerous results to the film 2, and without the danger of providing any needless, or inefficient, excess. The shadings for the indicia 56, 58, and 60 in Fig. 1 illustrate different colorings for the respective indicia, but any other arrangement thereof may be made.

It is necessary, for the positioning of the film 2 with respect to the indicia 56, 58, and 60, that some fixed relation of the sprockets should exist, at the time of the setting of the film, so that anyone, without any particular skill, or knowledge of the theory of operation, may assemble the film properly for efficient operation. A knob 62 is, therefore, mounted on that end of shaft 64 which extends forwardly from panel 8. On the inner end of shaft 64 is mounted a spur gear 66, which is brought into engagement with any particular one of the gear train, previously described, for the operations hereinafter appearing. In this particular construction, spur gear 66 is shown to have engagement with gear 28. On knob 62, and on the adjacent portion of panel 8 are engraved, or otherwise applied such indicia as the arrows 68 and 70. When the arrow 68 on knob 62 is brought into alignment with the arrow 70 on the panel 8, by suitable arrangement of the gear train, the Geneva movement, and the respective sprockets 10, 12, and 14, one set of the sprocket teeth of each of the sprockets will have been pointed substantially upwardly.

Sprocket 12, as previously described, has an intermittent motion, and therefore, only during a portion of the continuous movement of the sprockets 10 and 14, does the sprocket 12 move. It is, of course, to be understood that, for the proper cooperation of the Geneva movement with this arrangement, it is necessary either that the quiescent position of sprocket 12 is that in which one set of teeth point upwardly, or that, at the time the arrows 68 and 70 are being brought into agreement, the intermittent motion of sprocket must be taking place to bring the said set of teeth into position pointing upwardly. In the first supposed case, merely sprockets 10 and 14 are actually positioned, while in the last case, all the sprockets are simultaneously positioned.

After such settings of the sprockets, it is very simple for anyone, whether experienced or not, to position the film 2 with the indicia 56, 58, and 60 cooperating with the upturned teeth of the respective sprockets 10, 12, and 14. Of course, during this operation, the film 2 will have been threaded around the rolls 72 and 74, adjacent each of the end sprockets 10 and 14, to guide the film from the feeding reel, and to the take-up reel respectively. Said reels are not shown in this disclosure since they form no active part of the inventive concept involved. The film 2 will also have been threaded through the gate 44 for the proper cooperation of the film 2 therewith.

In Fig. 3, is disclosed the sound record 4, which is adapted for conjunctive use with the film and film feeding mechanism, previously described, in the following manner. In the operation of "talking" moving picture apparatus of this type, it is understood that the apparatus uutilized must provide for synchronous operation of a motion picture projection outfit and a sound reproducer of some kind. For this purpose, as disclosed in copending application Serial No. 324,071, filed December 6, 1928, noted above, a single power means has been provided for both the outfit and the reproducer, so that, necessarily, the two devices must be driven either at the same speed, or at directly proportionate speeds throughout their operation, when operated jointly. This provision in regard to speeds does not, however, fully solve the problem of synchronism, since the sound record, as is well known, may be started, actually, at any desired point, while the film itself does not ordinarily actively provide for any fixed starting point. In the particular disclosure of this invention, however, the record 4 is provided with a marking or indicia of a particular type which makes it possible for any amateur to solve the problem of synchronism. The marking, in the drawing of this invention, is seen to comprise a beginning groove 76, which extends away so distinctively from the first cut of the ordinary helix 78 of the record 4 that the operator of the apparatus can easily see the beginning point of the record, and set the stylus of the recorder therewith accordingly.

The starting groove illustrated in the drawings comprises a comparatively broad terminus 77 which gradually tapers into the ordinary helix or sound groove 78. It will be noted that the terminus 77 is spaced away from the first helix and progresses to the beginning of the sound groove by following a somewhat serpentine path 79. This arrangement has been found satisfactory to insure the proper beginning of synchronous operation of the sound record with the corresponding film record and to provide a starting marking for the record that is readily discernible by the operator.

It is purposed, therefore, that, before the source of power has been set in motion, the knob 62 will be rotated to set up teeth of the sprockets 10, 12, and 14, in the desired relations so that, when the film is properly threaded over said sprockets and through the gate 44, the indicia 56, 58, and 60 will properly cooperate with said sprockets. Now, either the record is rotated on the turn-table of the sound reproducer (not shown), or, as is apparent from the disclosure of my copending application Serial No. 324,071, filed December 6, 1928, above cited, the turn-table, with the record mounted thereon, is turned, until the stylus of the reproducer may be brought into engagement with the groove 76. Now, with the stylus engaging in groove 76 and the film parts set in their particular initial relations, and the loops 48 and 50 properly formed by the initial setting-up action, power is applied to the drive shaft 34, simultaneously with the application of power to the drive shaft of the turn-table of the sound reproducer, and the two reproductions are commenced simultaneously, and will, due to the timing of the drives of the motion picture apparatus and of the sound reproducer, so continue until the end of the particular record and film involved.

It will thus be seen that there are provided devices and an arrangement in which the several objects of this invention are achieved and which are well adapted to meet the conditions of practical use.

As various possible embodiments might be made of the above invention, and as various changes might be made in the embodiments above set forth, without departing from the spirit of the invention, it is to be understood that all matter herein set forth or shown in the accompanying drawing is to be interpreted as illustrative and not in a limiting sense.

I claim:

1. In combination sound and light record apparatus, a plurality of adjustable members for engaging said light record, light and sound records having indicia thereon to determine initial setting positions thereof, said records being set in initial position before said apparatus is operated, means for simultaneously changing the positions of said members to position them in a predetermined relation for cooperation with the light record indicia when positioning the light record on the apparatus, and indicia for indicating the proper setting of the last mentioned means.

2. In combination sound and light reproducing apparatus, a separate light record having indicia thereon for initial setting position thereof, a plurality of adjustable members for engaging said light record, means for simultaneously changing the positions of said members to position them in a predetermined relation for cooperation with the light record indicia, a sound record having a sound groove thereon and adapted to receive the stylus of a sound reproducer, a starting groove communicating with said sound groove and having a configuration adapted to cause the stylus to effect a serpentine movement before reaching the sound groove.

3. In combination, sound and light record apparatus, a plurality of adjustable members for engaging said light record, light and sound records having indicia thereon to determine initial setting positions thereof, said records being set in initial position before said apparatus is operated, and means for simultaneously changing the positions of said members to position them in a predetermined relation for cooperation with said light record indicia when positioning the light record on the apparatus.

In testimony whereof I affix my signature.

FERDINAND von MADALER.